No. 683,615. Patented Oct. 1, 1901.
W. H. MILLER & J. W. AYLSWORTH.
METHOD OF DUPLICATING PHONOGRAPHIC RECORDS.
(Application filed July 31, 1900.)
(No Model.)
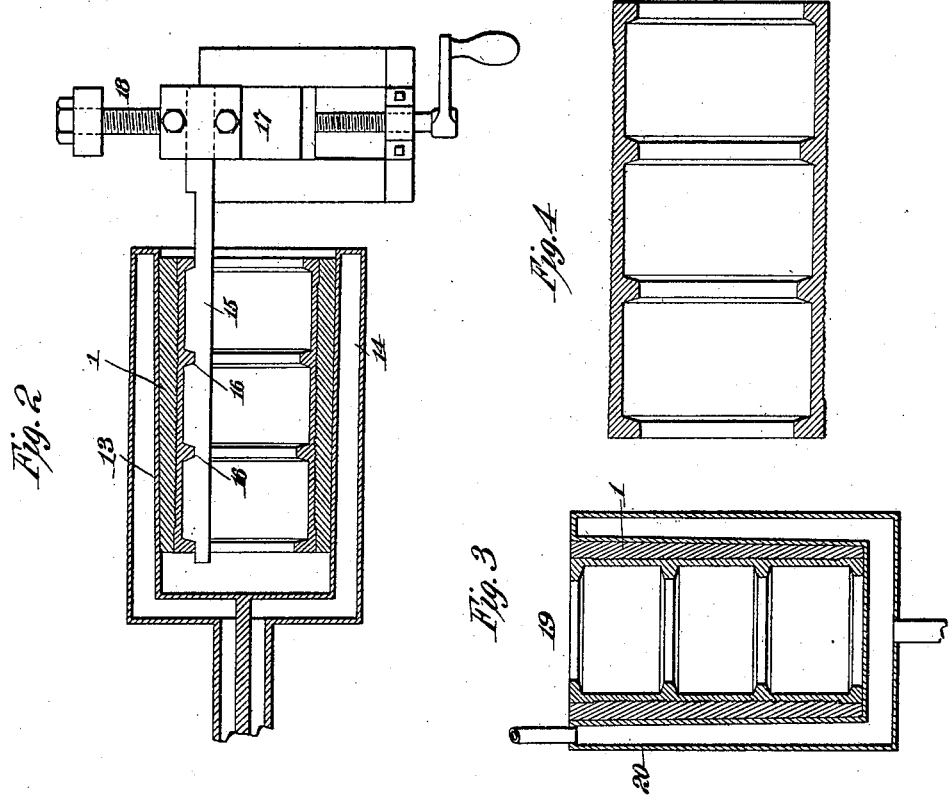
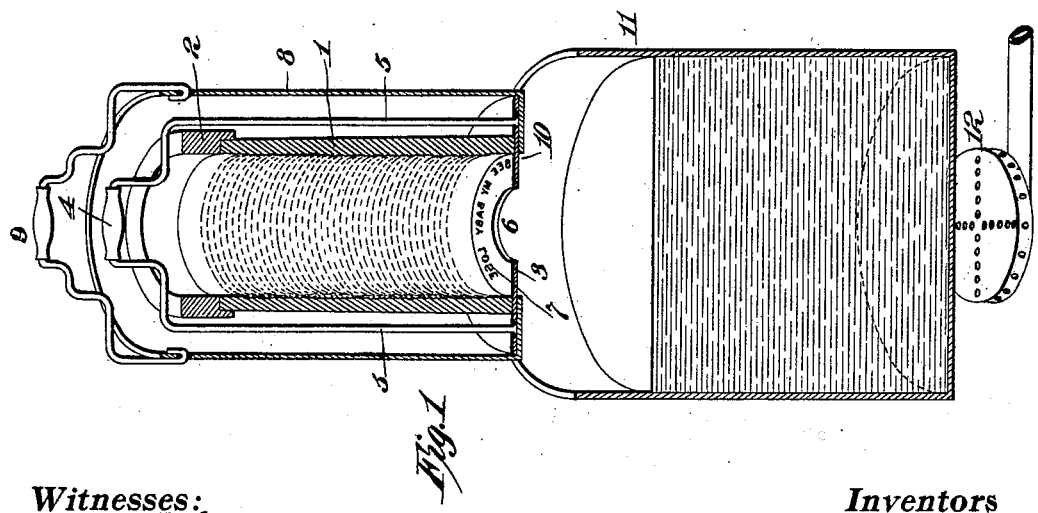
Witnesses: Inventors

UNITED STATES PATENT OFFICE.

WALTER HENRY MILLER, OF ORANGE, AND JONAS WALTER AYLSWORTH, OF EAST ORANGE, NEW JERSEY, ASSIGNORS TO NATIONAL PHONOGRAPH COMPANY, OF ORANGE, NEW JERSEY.

METHOD OF DUPLICATING PHONOGRAPHIC RECORDS.

SPECIFICATION forming part of Letters Patent No. 683,615, dated October 1, 1901.

Application filed July 31, 1900. Serial No. 25,391. (No specimens.)

*To all whom it may concern:*

Be it known that we, WALTER HENRY MILLER, of Orange, and JONAS WALTER AYLSWORTH, of East Orange, in the county of Essex and State of New Jersey, citizens of the United States, have invented a certain new and useful Method of Duplicating Phonographic Records, of which the following is a description.

Our invention relates to an improved process of duplicating phonographic records; and our object is to provide a process by which the duplicating of phonographic records can be carried on expeditiously and economically and duplicate records produced which are of superior quality.

In carrying our invention into effect we first secure a matrix or mold from which copies are to be produced, said matrix or mold being made by any suitable and approved process—as, for instance, by a process of electroplating on a vacuous deposit preliminarily secured upon an original phonographic cylinder, the electroplating being suitably backed up and strengthened by a metal jacket and the original cylinder being removed from the electroplated coating in any suitable way, as by melting the record or by contracting it by cold. The resulting matrix will obviously be a cylinder carrying on its bore a representation in negative or relief of the original record. From the matrix or mold secured in this or in any other approved way we make duplicates by a process of immersion or dipping of the matrix or mold in a bath of molten wax-like material from which the duplicates are to be secured, whereby a coating or covering of such material will be deposited upon the interior of the matrix or mold by reason of the lower temperature of the matrix or mold. After thus securing a sufficiently thick coating of material on the interior of the matrix or mold we remove the latter from the bath, carrying the deposited material with it, and we properly finish the duplicate so secured by reaming its interior to gage, trimming one of its ends, and afterward shrinking the duplicate from the matrix or mold.

In carrying out our improved process we may utilize any suitable apparatus for the purpose, and the apparatus illustrated in the accompanying drawings, which form a part of this specification, is merely an illustrative one and we do not wish to be limited thereto.

In the drawings, Figure 1 is a sectional view of the apparatus and mold in which the deposit or coating of the wax-like material is secured; Fig. 2, a corresponding view of the apparatus for properly reaming the interior of the duplicates; Fig. 3, a similar view of the apparatus employed for the shrinking of the duplicates from the matrix or mold, and Fig. 4 an enlarged corresponding view of one of the resulting duplicates.

In all of the above views corresponding parts are represented by the same numerals of reference.

1 represents a matrix or mold carrying on its bore the representation of the record which is to be duplicated, said representation being obviously in negative or relief. This matrix or mold is made by any approved process and is not a part of our invention.

2 is a metal cap which is removably fitted upon the upper end of the matrix or mold, with its bore corresponding in diameter with the bore of the matrix or mold.

3 is a metal disk provided with a handle 4, connected to side bars 5 5 and by which the disk may be manipulated. The matrix or mold 1 is carried by the disk 3, as shown. An opening 6 in the disk 3 is of considerably less diameter than the bore of the matrix or mold, and around said opening 6 and within the bore of the matrix or mold the disk may be formed in negative with a representation 7 of suitable words or characters to indicate the subject-matter of the duplicated record, its source of origin, &c.

8 is a sheet-metal receptacle provided with a handle 9 and which carries the disk 3 and the matrix or mold 1, as shown. The receptacle 8 is provided with an opening 10 therein, which may be of the same or of larger size than the opening 6 in the disk 3.

11 represents a tank which contains, as indicated, a proper supply of suitable wax-like material from which the duplicates are to be made and which material may be the ordinary commercial phonographic compositions now in use. The material in the tank 11 may be kept in a molten condition by heat applied in any suitable way, as by means of a gas-burner 12.

In carrrying out our process with the apparatus so far described we place the matrix or mold on the disk 3 and insert the latter, carrying the matrix or mold in the receptacle 8, as shown, after which the receptacle 8 is immersed in the molten material within the tank 11, which is permitted to enter the matrix or mold to a point above the upper end of the latter, but below the top of the cap 2, so that the material fills the interior of the matrix or mold, but does not overflow the same. The matrix or mold is thus kept immersed in the molten material for the desired time required to secure a deposit of the waxlike material of the required thickness. With the ordinary commercial phonographic composition now used maintained at from 20° to 40° above its melting-point and with a matrix or mold having a thickness of about one-fourth of an inch a deposit of material will be formed on the interior of the matrix or mold of the desired thickness after an immersion of about three minutes. Obviously, however, this time will vary with the peculiar conditions under which the process may be carried out; but in no instance should the matrix or mold be immersed within the molten material for a long enough time to allow its temperature to be raised sufficiently to permit the deposited molten material thereon to become remelted. The reduced temperature of the matrix or mold relative to the temperature of the molten material causes the latter to become coagulated or chilled on the interior of the matrix and to deposit thereon to the thickness desired. This chilling also makes the outer surface of the resulting duplicates much smoother than is the case with duplicates made by a mechanical duplicating process. Owing to the thinness of the walls of the receptacle 8 the metal thereof very quickly attains the temperature of the molten material, so that none of the molten material will accumulate thereon. It will be understood that the matrix or mold may be made of increased thickness or be artificially cooled before the dipping operation when the composition is of a character requiring an increased cooling effect to secure the desired thickness of deposit. When the desired deposit of molten material is secured, the receptacle 8 is removed from the bath of molten material and the disk 3, carrying the mold, is removed from said receptacle. Obviously the lower edge of the resulting duplicate will be perfectly true, being formed by the portion of the disk 3 between the opening 6 and the bore of the matrix or mold, and if a representation 7 is formed on that portion of the disk such representation will be cast in the bottom end of the duplicate. The cap 2 is now removed from the matrix or mold and the upper end of the duplicate is trimmed off flush with the upper surface of the matrix or mold by any desired form of cutting-tool. The matrix or mold, which has a slightly-tapered outer surface, is now placed in a tapered chuck 13, as shown in Fig. 2, which chuck is provided with a water-jacket 14, through which cold water may circulate in order that the matrix or mold may be kept cold enough to maintain the resulting duplicate or at least the outer surface thereof in a chilled and hardened condition. The chuck 13 being rotated in any suitable way, a reaming-tool 15, held at an angle to give the desired taper to the bore of the duplicate, is introduced within the same, and by reason of the cut-away portions 16 in said reaming-tool a series of ribs will be formed on the duplicate, as shown in Fig. 4, by which the latter will be properly held upon the mandrel of the reproducing-phonograph in the usual way. The reaming-tool 15 is carried by the usual slide-head 17 of the lathe, and the depth of cut of said tool is limited by a regulating-screw 18, as shown. This reaming of the interior of the duplicate is preferably carried on before the resulting duplicate has cooled sufficiently to become hard and before it has contracted from the bore of the matrix, whereby the reaming operation can be carried on effectively and smoothly. After the interior of the duplicate has been properly reamed, as explained, the matrix or mold is removed from the chuck 13 and inserted in a cooling-mold 19, having a water-jacket 20 and through which cold water may circulate, the matrix or mold being kept in the cooling-mold until the resulting duplicate has contracted sufficiently to enable it to be removed from the matrix or mold, whereupon the operation will be completed. By reaming the interior of the resulting duplicates, as explained, to form a series of ribs therein the duplicates may be made much thinner than the ordinary original records, and hence more economically, it being of course understood that the material removed by the reaming-tool will be used for the manufacture of subsequent duplicates.

While our improved process is particularly adapted for the manufacture of duplicate records, it will be understood that the process may be carried out in connection with the manufacture of phonograph-blanks by employing a matrix or mold having a smooth bore, in which a deposit may accumulate by a process of immersion, as described. The deposited blank will be reamed on its interior, trimmed on its outer edge, and removed by shrinking or otherwise in exactly the same way as that described in connection with the manufacture of duplicate records. Such a process not only provides for the cheap and effective manufacture of phonograph-blanks, but by its carrying out a superior article is produced, since the record-surface of the blanks will be smooth and calendered in appearance. With such blanks therefore after having received a record in any suitable way the reproduction will be smoother and freer of extraneous sounds than reproductions obtained from records made on other blanks.

We do not claim herein the apparatus above described for carrying our invention into effect, since such apparatus is made the subject of our companion application filed on even date herewith and numbered serially 25,392.

Having now described our invention, what we claim as new, and desire to secure by Letters Patent, is as follows:

1. The method of making a cylindrical phonographic surface, which consists in immersing a continuous tubular mold in a molten wax-like coagulable material, whereby the material will accumulate on the bore of the mold and will chill thereon in a layer of the desired thickness, then in contracting the deposited material, and finally in removing it longitudinally from the mold, substantially as set forth.

2. The method of duplicating phonographic records, which consists in immersing a continuous cylindrical mold or matrix carrying the record in relief on its bore in a molten wax-like coagulable material, whereby the material will accumulate on the bore of the matrix or mold and chill thereon in a layer of the desired thickness, then in contracting the deposited material, and finally in removing it by a direct longitudinal movement from the matrix or mold, substantially as set forth.

3. The method of duplicating phonographic records, which consists in immersing a mold or matrix carrying the record in relief on its bore in a molten wax-like coagulable material, whereby the material will accumulate on the bore of the matrix or mold and chill thereon in a layer of the desired thickness, in finishing the bore of the duplicate so secured, and in separating the duplicate from the matrix or mold, substantially as set forth.

4. The method of duplicating phonographic records, which consists in immersing a mold or matrix carrying the record in relief on its bore in a molten wax-like coagulable material, whereby the material will accumulate on the bore of the matrix or mold and chill thereon in a layer of the desired thickness, in finishing the bore of the duplicate so secured, and in shrinking the duplicate from the matrix or mold, substantially as set forth.

5. The method of duplicating phonographic records, which consists in immersing a mold or matrix carrying the record in relief on its bore in a molten wax-like coagulable material, whereby the material will accumulate on the bore of the matrix or mold and chill thereon in a layer of the desired thickness, in finishing the bore of the duplicate so secured before the latter has become hard, and in separating the duplicate from the matrix or mold, substantially as set forth.

6. The method of duplicating phonographic records, which consists in immersing a matrix or mold carrying the record in relief on its bore in a molten wax-like coagulable material which is excluded from the exterior of the matrix or mold and only enters the bore thereof, whereby the reduced temperature of the matrix or mold causes the material to chill on the bore and accumulate in a layer of the desired thickness, in removing the matrix or mold from the molten material, in trimming the bore of the duplicate so secured, and in separating the duplicate from the matrix or mold, substantially as set forth.

7. The method of duplicating phonographic records, which consists in immersing a matrix or mold carrying the record in relief on its bore in a molten wax-like coagulable material which is excluded from the exterior of the matrix or mold and only enters the bore thereof, whereby the reduced temperature of the matrix or mold causes the material to chill on the bore and accumulate in a layer of the desired thickness, in removing the matrix or mold from the molten material, then in maintaining the reduced temperature of the matrix or mold while the interior of the duplicate is finished, and finally in further reducing the temperature of the matrix or mold to cause the resulting duplicate to be contracted, whereby it may be removed by a direct longitudinal movement, substantially as set forth.

This specification signed and witnessed this 17th day of July, 1900.

WALTER HENRY MILLER.
JONAS WALTER AYLSWORTH.

Witnesses:
J. L. EVANS,
HENRY WACHENFELD.